(12) United States Patent
Shirane et al.

(10) Patent No.: US 8,435,675 B2
(45) Date of Patent: May 7, 2013

(54) NON-AQUEOUS ELECTROLYTE SECONDARY BATTERY WITH HIGH CAPACITY AND GOOD LIFE CHARACTERISTICS

(75) Inventors: Takayuki Shirane, Osaka (JP); Takashi Takeuchi, Osaka (JP); Takaya Saito, Tochigi (JP)

(73) Assignee: Panasonic Corporation, Osaka (JP)

( * ) Notice: Subject to any disclaimer, the term of this patent is extended or adjusted under 35 U.S.C. 154(b) by 1139 days.

(21) Appl. No.: 11/795,801

(22) PCT Filed: Mar. 23, 2006

(86) PCT No.: PCT/JP2006/305862
§ 371 (c)(1),
(2), (4) Date: Jul. 23, 2007

(87) PCT Pub. No.: WO2006/109495
PCT Pub. Date: Oct. 19, 2006

(65) Prior Publication Data
US 2008/0118837 A1 May 22, 2008

(30) Foreign Application Priority Data
Apr. 12, 2005 (JP) ................................ 2005-114787

(51) Int. Cl.
*H01M 4/13* (2010.01)
(52) U.S. Cl.
USPC ..................................... 429/231.8; 429/218.1
(58) Field of Classification Search .................. 429/221, 429/231.1, 231.8, 218.1
See application file for complete search history.

(56) References Cited

U.S. PATENT DOCUMENTS

| | | | |
|---|---|---|---|
| 5,616,437 A * | 4/1997 | Gao | 429/245 |
| 6,451,482 B1 * | 9/2002 | Watanabe et al. | 429/231.1 |
| 6,605,386 B1 | 8/2003 | Kasamatsu et al. | |
| 6,638,662 B2 * | 10/2003 | Kaneda et al. | 429/231.8 |
| 7,658,863 B2 * | 2/2010 | Aramata et al. | 252/182.1 |
| 2002/0031701 A1 * | 3/2002 | Kawakami et al. | 429/137 |
| 2002/0164479 A1 * | 11/2002 | Matsubara et al. | 428/367 |
| 2004/0175621 A1 * | 9/2004 | Iriyama et al. | 429/231.95 |
| 2004/0209156 A1 * | 10/2004 | Ren et al. | 429/49 |
| 2005/0271943 A1 * | 12/2005 | Park et al. | 429/231.1 |

FOREIGN PATENT DOCUMENTS

| | | |
|---|---|---|
| JP | 11-007944 | 1/1999 |
| JP | 11-307126 | 11/1999 |
| JP | 2003-077463 | 3/2003 |
| JP | 2004-055539 | 2/2004 |
| WO | WO 2004/102701 A1 | 11/2004 |

* cited by examiner

*Primary Examiner* — Zachary Best
(74) *Attorney, Agent, or Firm* — McDermott Will & Emery LLP (57) ABSTRACT

Disclosed is a non-aqueous electrolyte secondary battery comprising a positive electrode containing a nickel-containing lithium composite oxide, a negative electrode containing graphite, and a non-aqueous electrolyte. The cut-off voltage of charge of this non-aqueous electrolyte secondary battery is 4.25 to 4.6 V. The negative electrode contains an additive that reacts with lithium at a potential higher than the potential of graphite. The ratio A/B of a positive electrode capacity A based on the weight of the nickel-containing lithium composite oxide and the cut-off voltage of charge relative to a weight B of the graphite contained in a portion of a negative electrode material mixture layer opposing to a positive electrode material mixture layer is 300 to 340 mAh/g, and the irreversible capacity C of the positive electrode and the irreversible capacity D of the negative electrode in the portion opposing to the positive electrode satisfies $C \geq D$.

5 Claims, 2 Drawing Sheets

NON-AQUEOUS ELECTROLYTE SECONDARY BATTERY WITH HIGH CAPACITY AND GOOD LIFE CHARACTERISTICS

RELATED APPLICATIONS

This application is the U.S. National Phase under 35 U.S.C. §371 of International Application No. PCT/W2006/305862, filed on Mar. 23, 2006, which in turn claims the benefit of Japanese Application No. 2005-114787, filed on Apr. 12, 2005, the disclosures of which Applications are incorporated by reference herein.

TECHNICAL FIELD

The present invention relates to non-aqueous electrolyte secondary batteries, and specifically relates to non-aqueous electrolyte secondary batteries with high capacity and improved life characteristics.

BACKGROUND ART

For power sources for driving electronic devices such as mobile communication devices and personal computers, non-aqueous electrolyte secondary batteries having a high electromotive force and a high energy density have been widely used. In recent years, with improving functionality of these electronic devices, demand for non-aqueous electrolyte secondary batteries with higher capacity and longer life has been increased.

For a positive electrode active material for use in non-aqueous electrolyte secondary batteries, $LiCoO_2$ has been widely used. In addition to this, there has been used, for example, a nickel-containing lithium composite oxide, $LiMn_2O_4$, or a solid solution in which a heteroelement(s) is dissolved into these, or a mixture of these.

Among these positive electrode active materials, the nickel-containing lithium composite oxide is an active material suitable for improvement in capacity because of its large theoretical capacity at 4.2 V. With respect to the positive electrode active materials other than this, one proposal suggests that the end of charge voltage (cut-off voltage of charge) be set higher than 4.2 V, so that a further improvement in capacity can be achieved (for example, see Patent Document 1).

The irreversible capacity during initial charge and discharge (the difference between an initial charge capacity and an initial discharge capacity) of the nickel-containing lithium composite oxide is larger than that of graphite that is used for a negative electrode active material. This causes a problem in that lithium ions normally capable of contributing to the battery capacity will not return to the positive electrode but remain in the negative electrode. In order to solve such a problem, another proposal suggests that an appropriate amount of an additive capable of effecting reduction reaction such as $Ag_2O$ or NiO be added into the negative electrode (for example, see Patent Document 2). By doing this, it is possible to allow this additive to consume the lithium in an amount equivalent to the irreversible capacity of the nickel-containing lithium composite oxide, to obtain the same level of irreversible capacities of the positive electrode and the negative electrode, and eventually to improve the substantial effective capacity of the negative electrode.

Patent Document 1: Japanese Patent Laid-Open Publication No. 2004-055539
Patent Document 2: Japanese Patent Laid-Open Publication No. Hei 11-007944

DISCLOSURE OF THE INVENTION

Problems to Be Solved by the Invention

In Patent Document 1, improvement in capacity of the positive electrode active material is achieved by using a higher end of charge voltage, and at the same time, a measure is taken so that the capacity of the negative electrode will not be excessively increased even in a full charged state while the capacity of the positive electrode is increased. In other words, in a design for high voltage charging, the ratio of the weight of the negative electrode active material to the weight of the positive electrode active material is set to high. However, in the case where a material having an irreversible capacity larger than that of the negative electrode active material is used as the positive electrode active material, lithium ions that cannot contribute to the capacity will be present, and in some cases, the efficiency in capacity improvement achieved by high voltage charging is reduced.

In Patent Document 2, since an additive is used to raise the potential of negative electrode, even in a charged state, the potential of positive electrode is increased by an amount equivalent to the increase in the potential of negative electrode. In general, it is considered that a $LiNiCoO_2$-based material as used in Example of Patent Document 2 has high reactivity with a non-aqueous electrolyte and the reactivity is accelerated as the potential of positive electrode is increased. Accordingly, when this battery is subjected to high voltage charging, there may be a possibility that gas generation is accelerated.

The present invention therefore intends to provide a non-aqueous electrolyte secondary battery with long life and high capacity even when charged to a high voltage range.

Means for Solving the Problems

A non-aqueous electrolyte secondary battery of the present invention comprises a positive electrode including a positive electrode material mixture layer including a nickel-containing lithium composite oxide, a negative electrode including a negative electrode material mixture layer including graphite, and a non-aqueous electrolyte, and has a cut-off voltage of charge of 4.25 to 4.6 V. The negative electrode includes an additive that reacts with lithium at a potential higher than a maximum potential of graphite during charge and discharge; the ratio A/B of a positive electrode capacity A based on a weight of the nickel-containing lithium composite oxide and the cut-off voltage of charge relative to a weight B of the graphite contained in a portion of the negative electrode material mixture layer opposing to the positive electrode material mixture layer is 300 to 340 mAh/g; and an irreversible capacity C of the positive electrode and an irreversible capacity D in the portion of the negative electrode material mixture layer opposing to the positive electrode material mixture layer satisfy $C \geq D$.

It is to be noted that a potential which graphite can take during charge and discharge is highest at the start of charging (or at the end of discharging). The potential of graphite at this time is approximately 0.3 V (vs $Li/Li^+$). Therefore, as the above described additive, a material that reacts with lithium at a higher potential than that potential (0.3 V) is used.

In the above described non-aqueous electrolyte secondary battery, the additive is preferably at least one selected from the group consisting of NiO, CoO, $Co_2O_3$, $Co_3O_4$, $TiO_2$, $MnO_2$, $Fe_3O_4$, Sn, Si, SiO and $SiO_n$ ($0<n\leqq 1.5$).

In the above described non-aqueous electrolyte secondary battery, the additive may be included in the negative electrode material mixture layer, or a layer including the additive may be laminated on the negative electrode material mixture layer. It is preferable that the amount of the additive included in the negative electrode is 0.5 to 4.2 parts by weight per 100 parts by weight of graphite.

It is preferable that in the above described non-aqueous electrolyte secondary battery, the nickel-containing lithium composite oxide is represented by the general formula:

where $0.99\leqq x\leqq 1.1$, $0<y+z\leqq 0.7$, $0<y\leqq 0.4$ and M is at least one element selected from Mg, Al, Co, Sr, Y, Zr and Mo.

Effect of the Invention

The present invention can provide a non-aqueous electrolyte secondary battery with high capacity and favorable life characteristics.

BEST MODE FOR CARRYING OUT THE INVENTION

Figure 1:
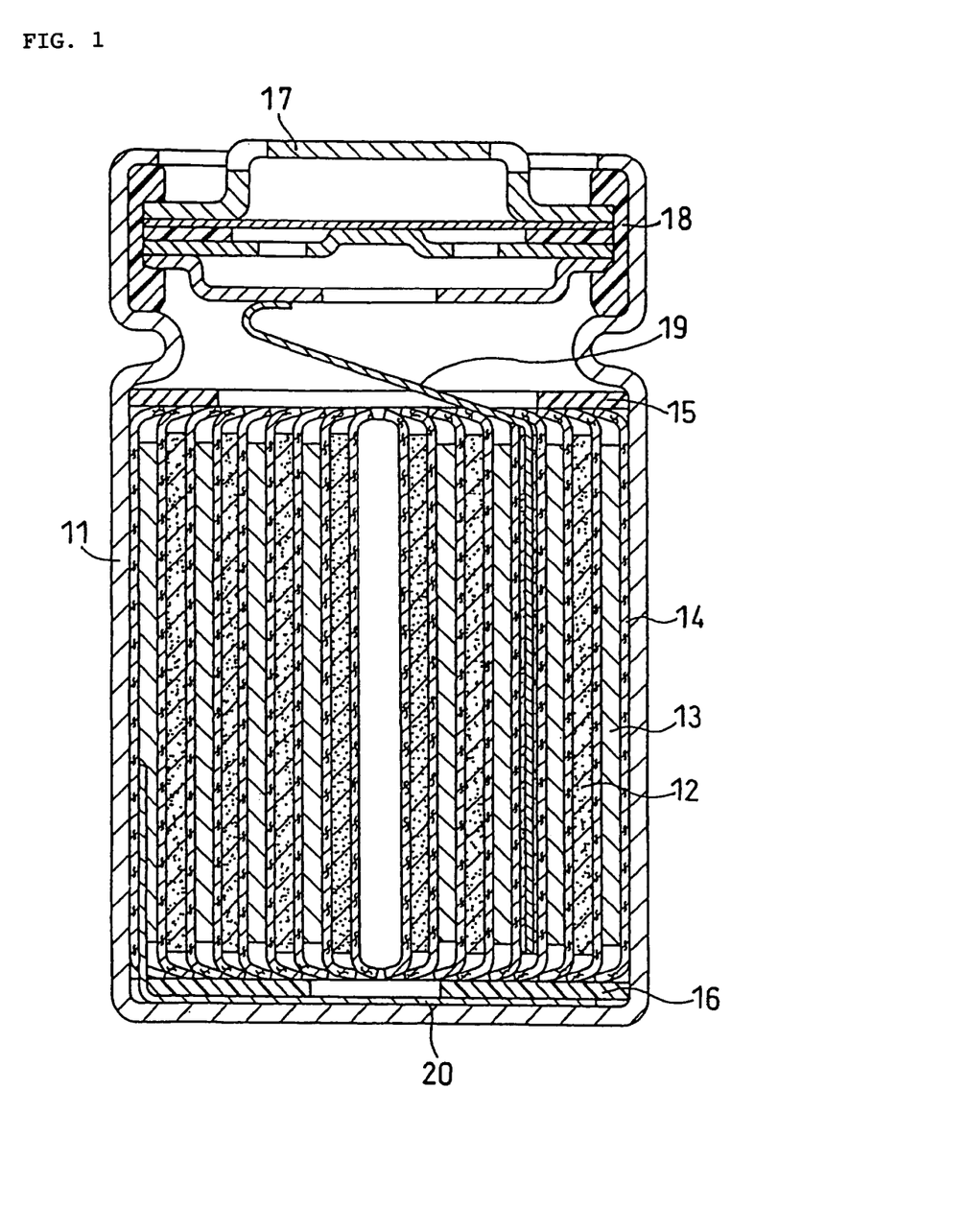
FIG. 1 A vertical sectional view schematically illustrating a non-aqueous electrolyte secondary battery in accordance with an embodiment of the present invention FIG. 2 Initial charge and discharge curves of the non-aqueous electrolyte secondary battery in accordance with an embodiment of the present invention

FIG. 1 shows a non-aqueous electrolyte secondary battery in accordance with an embodiment of the present invention.

The non-aqueous electrolyte secondary battery in FIG. 1 includes a battery case 11, an electrode assembly housed in the battery case 11 and a non-aqueous electrolyte (not shown).

The electrode assembly includes a positive electrode 12, a negative electrode 13, a separator 14 interposed between the positive electrode 12 and the negative electrode 13. In the electrode assembly, these are wound spirally. On the top and the bottom of the electrode assembly, an upper insulating plate 15 and a lower insulating plate 16 are disposed, respectively. An opening of the case 11 is sealed by crimping the opening end of the case 11 onto a sealing plate 17 via a gasket 18.

Moreover, one end of a positive electrode lead 19 is attached to the positive electrode 12, and the other end of the positive electrode lead 19 is connected with the sealing plate 17. One end of a negative electrode lead 20 is attached to the negative electrode 13, and the other end of the negative electrode lead 20 is connected with the battery case 11 also serving as a negative electrode terminal.

The positive electrode includes a positive electrode current collector and a positive electrode material mixture layer carried thereon. The positive electrode material mixture layer includes a positive electrode active material, a binder and a conductive agent. In the present invention, for the positive electrode active material, a nickel-containing lithium composite oxide is used.

The negative electrode includes a negative electrode current collector and a negative electrode material mixture layer carried thereon. The negative electrode material mixture layer includes graphite as a negative electrode active material and a binder. In the present invention, the negative electrode further includes an additive (hereinafter referred to as a negative electrode additive) that reacts with lithium at a potential higher than a maximum potential of graphite during charge and discharge.

As the positive electrode active material, as described above, the nickel-containing lithium composite oxide is used. The nickel-containing lithium composite oxide is preferably a solid solution containing manganese (Mn). The inclusion of manganese realizes an improvement in thermal stability in a charged state. However, when the composite oxide contains manganese, the manganese may be leached from the composite oxide into the non-aqueous electrolyte during storage at a high temperature. The leached manganese may be deposited on the negative electrode to cause degradation in cycle characteristics and the like. For this reason, it is preferable that the nickel-containing lithium composite oxide is a solid solution further containing at least one selected from Co, Mg, Al, Sr, Y, Zr and Mo in addition to manganese. This makes it possible to stabilize the structure of the nickel-containing lithium composite oxide and prevent the leaching of manganese.

Moreover, in the case where a nickel-containing lithium composite oxide containing at least one metal element as described above is prepared, it is necessary to bake a nickel-containing lithium composite oxide and a salt containing the above described at least one metal element at a higher temperature. However, since the specific surface area of the composite oxide is decreased as a result of this baking, the reaction between the composite oxide and the non-aqueous electrolyte is reduced, and thus an effect of reducing gas generation can be obtained.

Accordingly, in the present invention, as the positive electrode active material, it is preferable to use a nickel-containing lithium composite oxide represented by the general formula:

where $0.99\leqq x\leqq 1.1$, $0<y+z\leqq 0.7$, $0<y\leqq 0.4$ and M is at least one selected from Mg, Al, Co, Sr, Y, Zr and Mo. This composite oxide is a solid solution containing manganese and at least one metal element M selected from the group consisting of Co, Mg, Al, Sr, Y, Zr and Mo. Since this composite oxide contains manganese, the thermal stability in a charged state is improved as described above. Further, the inclusion of at least one metal element M selected from the group consisting of Co, Mg, Al, Sr, Y, Zr and Mo can suppress the leaching of manganese from the composite oxide.

In the above described positive electrode active material, it is preferable that a molar ratio x of lithium is $0.99\leqq x\leqq 1.1$. When x is smaller than 0.99, the amount of lithium is practically small and thus the capacity is reduced. On the other hand, x is greater than 1.1, an excessive amount of lithium is contained. The excessive amount of lithium reacts with carbon dioxide in the air to give lithium carbonate. The lithium carbonate contained in the positive electrode active material may decompose in the interior of the battery to generate gas. Furthermore, in the case where, for example, polyvinylidene fluoride known as a typical positive electrode binder is used when preparing a positive electrode material mixture paste, because of the high basicity of the lithium carbonate, the paste may be gelled.

Herein, the molar ratio x varies beyond the above described range of x in association with charge and discharge of the battery.

Further, it is preferable that a molar ratio y of manganese is $0<y\leqq 0.4$. When the molar ratio y of manganese exceeds 0.4, it may be difficult to synthesize a nickel-containing lithium composite oxide having R3-m (laminated structure).

Furthermore, it is preferable that a molar ratio y+z of the sum of the manganese and the element M is 0<y+z≦0.7. When the molar ratio y+z of the sum of the manganese and the element M exceeds 0.7, the irreversible capacity of the positive electrode active material is smaller than that of the negative electrode active material, and thus an effect due to the inclusion of the negative electrode additive may not be obtained.

The negative electrode additive included in the negative electrode has an effect of raising the potential of negative electrode itself and preventing the potential of negative electrode from dropping to a potential at which lithium is deposited in the final stage of charging. Since such a negative electrode additive is used, it is possible to suppress the deposition of metallic lithium on the negative electrode even in the case where a nickel-containing lithium composite oxide (for example, the composite oxide represented by the above general formula) that is excellent in potential flatness in the final stage of charging, that is, is easily charged at a high rate until a cut-off voltage of charge is reached is used as the positive electrode active material. This makes it possible to charge until the high charge voltage is reached, and thus to achieve an improvement in capacity.

In order to allow the effect of achieving a capacity improvement as described above to be exerted sufficiently, in the present invention, the cut-off voltage of charge of a non-aqueous electrolyte secondary battery is set to 4.25 V and 4.6 V, and the ratio (A/B) of a positive electrode capacity A based on a weight of the nickel-containing lithium composite oxide and the cut-off voltage of charge relative to a weight B of graphite is set to 300 to 340 mhA/g.

It is to be noted that the weight B of graphite is an amount of the graphite contained in a portion of the negative electrode material mixture layer opposing to the positive electrode material mixture layer, that is, the amount of the graphite contained in a portion having the same area as that of the positive electrode material mixture layer in the negative electrode material mixture layer. It is preferable that the size of the negative electrode material mixture layer is larger than that of the positive electrode material mixture layer.

When the A/B is less than 300 mAh/g, the effect of the present invention cannot be sufficiently utilized. On the other hand, the A/B exceeds 340 mAh/g, the effective capacity of graphite approaches the theoretical capacity. The potential of graphite that is charged up to nearly the theoretical capacity is almost 0 V with respect to the $Li/Li^+$ electrode. At such a circumstance, when more current is allowed to flow, the potential of graphite is reduced below 0 V because of polarization, causing metallic lithium to deposit on the negative electrode. The deposition of metallic lithium as such reduces the capacity. Moreover, the deposition of metallic lithium on the negative electrode accelerates the degradation (decomposition) of the non-aqueous electrolyte and thus so-called electrolyte depletion occurs. When the electrolyte depletion occurs, the reception of lithium ions in the negative electrode is further degraded. This causes a sharp decrease in the life characteristics.

It is to be noted that the positive electrode capacity A is a sum of an effective capacity of the positive electrode that actually contributes to charge and discharge reaction and an irreversible capacity C, and is determined, for example, by a single electrode test using the positive electrode and the metallic lithium as a counter electrode thereof. In the case where the cut-off voltage of charge of the non-aqueous electrolyte secondary battery of the present invention is set, for example, to 4.6 V, the effective capacity of the positive electrode can be determined by charging at a predetermined current density until the potential of the positive electrode reaches 4.7 V (equivalent to 4.6 V of an actual battery using graphite as the negative electrode).

The irreversible capacity C of the positive electrode can be determined after charging in the above described single electrode test, by discharging at a predetermined current density until the potential of the positive electrode reaches 3.1 V (equivalent to 3.0 V of an actual battery using graphite as the negative electrode).

Furthermore, in the present invention, the irreversible capacity C of the positive electrode is equal to or larger than an irreversible capacity D in the portion of the negative electrode material mixture layer opposing to the positive electrode material mixture layer. It is preferable that the irreversible capacity C of the positive electrode is larger than the irreversible capacity D in the portion of the negative electrode material mixture layer opposing to the positive electrode material mixture layer (irreversible capacity C>irreversible capacity D). For example, in the case where a positive electrode active material such as $LiCoO_2$, the irreversible capacity C of which is smaller than the irreversible capacity D of the negative electrode, is used, the battery capacity will be predominately affected by the irreversible capacity D of the negative electrode. In such a case, if a negative electrode additive is added to the negative electrode, the potential of negative electrode can be increased; however, the negative electrode additive consumes lithium irreversibly and thus the irreversible capacity D of the negative electrode is further increased, reducing the battery capacity.

In the case where a negative electrode additive is not added into the negative electrode, or where the amount of negative electrode additive added is significantly insufficient, in the initial stage of charge and discharge cycles, the negative electrode includes the lithium that cannot return to the positive electrode, making the actual state of charge of the negative electrode active material greater than the apparent state of charge thereof. In order to prevent the state of charge of the negative electrode from being increased, it is effective to add an appropriate amount of the negative electrode additive. On the other hand, the irreversible capacity C of the positive electrode varies depending on the type or synthesizing conditions, etc. of the positive electrode active material. Therefore, the type and the adding amount of the negative electrode additive need to be adjusted according to the type etc. of the positive electrode active material.

The irreversible capacity D of the negative electrode is a sum of an irreversible capacity due to the inclusion of the negative electrode additive in the negative electrode (hereinafter also referred to as a theoretical lithiation amount) D1 and a theoretical irreversible capacity D2 (i.e., D=D1+D2). The irreversible capacity D1 due to the negative electrode additive is produced in the following manner.

For example, when the negative electrode additive is NiO, this negative electrode additive reacts with lithium. Since this reaction is irreversible, the lithium reacted with the negative electrode additive does not contribute to the charge and discharge reaction. The irreversible capacity D1 can be adjusted by varying the type of the negative electrode additive or the adding amount of the negative electrode additive to the negative electrode.

Accordingly, the irreversible capacity D can be adjusted by adjusting the irreversible capacity D1 as needed.

Graphite becomes electrochemically inactive while a part of the graphite particle includes lithium ions during repeated charge and discharge cycles. In this case, the absorption and desorption of lithium is disabled, and thus the capacity thereof may be reduced.

As described above, by adjusting the irreversible capacity C of the positive electrode to be equal to or larger than the irreversible capacity D of the negative electrode, that is, by adjusting the effective capacity of the negative electrode to be equal to or larger than the effective capacity of the positive electrode, it is possible to prevent the effective capacity of the negative electrode from becoming smaller than the effective capacity of the positive electrode even when the effective capacity of the negative electrode is reduced after repeated charge and discharge cycles. In the case where the effective capacity of the negative electrode becomes smaller than the effective capacity of the positive electrode, the possibility is high that the deposition of metallic lithium has relevance to the deterioration of the battery. The metallic lithium deposited on the negative electrode is low in thermal stability. Moreover, as described above, the deposition of metallic lithium may cause the deterioration of the battery to further proceed. Therefore, it is preferable that in the final stage of the charge and discharge cycles, the deterioration of the battery is caused by the deterioration of the positive electrode.

In order to prevent the effective capacity of the negative electrode from becoming smaller than the effective capacity of the positive electrode, that is, to suppress the deterioration of the negative electrode, it is important that the potential of the negative electrode with respect to the metallic lithium will not be reduced to 0 V or less and an apparent state of charge will not be increased. In the present invention, these can be successfully realized and thus at the same time an improvement in capacity can be achieved effectively.

It is to be noted that when two or more negative electrode additives are added into the negative electrode, the irreversible capacity due to the negative electrode additive is a sum of the irreversible capacities of the respective negative electrode additives added. For example, in the case where two negative electrode additives are added, the irreversible capacity D of the negative electrode is a sum of an irreversible capacity $D1a$ due to a first negative electrode additive, an irreversible capacity $D1b$ due to a second negative electrode additive and the theoretical irreversible capacity $D2$ of graphite.

In the present invention, for the negative electrode additive, at least one selected from the group consisting of NiO, CoO, $Co_2O_3$, $Co_3O_4$, $TiO_2$, $MnO_2$, $Fe_3O_4$, Sn, Si, SiO and $SiO_n$ ($0<n\leq1.5$) is used. Among these, it is more preferable to use at least one selected from the group consisting of NiO, Sn, Si and $SiO_n$ ($0<n\leq1.5$) because they have a large reaction capacity for lithium and even an addition of small amount thereof into the negative electrode can increase the potential of the negative electrode.

As described above, by adding the negative electrode additive into the negative electrode and adjusting the irreversible capacity C of the positive electrode to be equal to or larger than the irreversible capacity D of the negative electrode, it is possible to obtain an effective capacity of graphite larger than the conventional effective capacity of graphite, that is, it is possible to increase the battery capacity and at the same time to improve the life characteristics.

The negative electrode additive preferably has a large reaction capacity for lithium. When the reaction capacity of the negative electrode additive is large, the adding amount of the negative electrode additive into the negative electrode can be reduced. When the adding amount of the negative electrode additive is increased, the negative electrode plate may swell or the cost may be increased.

The negative electrode additive may function also as an active material. For example, Sn and Si have a large irreversible capacity, compared with graphite. Therefore, the effect of the present invention can be achieved when such Sn or Si is used as the negative electrode additive.

As described above, the negative electrode additive is included in the negative electrode. The negative electrode additive may be mixed in the negative electrode material mixture layer. Alternatively, a layer including the negative electrode additive may be formed on the surface of the negative electrode material mixture layer, that is, the surface of the negative electrode. Since an electrode reaction proceeds mainly on the surface of an electrode, the formation of the layer including the negative electrode additive on the surface of the negative electrode material mixture layer enables the effect of the present invention to exert more efficiently, compared with the case where the negative electrode additive is mixed in the negative electrode material mixture layer. Therefore, it is more preferable that the layer including the negative electrode additive is disposed on the surface of the negative electrode.

The layer including the negative electrode additive may be formed on the negative electrode, for example, by preparing a paste or the like including the negative electrode additive, and then applying the paste onto the negative electrode. The paste including the negative electrode additive may be applied onto the negative electrode, for example, by means of die coating, gravure coating, spray coating, spin coating or dipping.

The amount of the negative electrode additive included in the negative electrode is preferably 0.5 to 4.2 parts by weight per 100 parts by weight of graphite. When the adding amount of the negative electrode additive is less than 0.5 parts by weight per 100 parts by weight of graphite, the charge potential of the negative electrode may not be increased as desired. When the adding amount exceeds 4.2 parts by weight, the irreversible capacity D of the negative electrode approaches the irreversible capacity C of the positive electrode. In this case, when the negative electrode is deteriorated, the irreversible capacity D of the negative electrode becomes larger than the irreversible capacity C of the positive electrode, and thus the battery capacity may be reduced.

As the binder included in the positive electrode, polyvinylidene fluoride (hereinafter also referred to as PVDF) or a modified product thereof, polytetrafluoroethylene (hereinafter also referred to as PTFE) or a modified product thereof, a core-shell type rubber particle including a polyacrylic modified product, a rubber material soluble in an organic solvent including a polyacrylic modified product, or the like may be used.

As the conductive agent included in the positive electrode, carbon black such as acetylene black (hereinafter also referred to as AB) or Ketjen Black, graphite, or the like may be used.

Furthermore, in the case where PTFE or a modified product thereof, a core-shell type rubber particle, or the like is used as the binder, it is preferable that carboxymethyl cellulose (hereinafter also referred to as CMC) and/or a modified product thereof is added as the thickening agent.

The positive electrode may be fabricated, for example, in the following manner.

A positive electrode active material, a binder, a conductive agent and if necessary, a thickening agent are mixed with a dispersion medium to give a positive electrode material mixture pate. The resultant positive electrode material mixture paste is applied onto a positive electrode current collector composed of a metallic aluminum foil and then dried to form a positive electrode material mixture layer on the current collector. Subsequently, the positive electrode material mixture layer is rolled until a predetermined thickness is obtained. Thereafter, the resultant electrode plate is cut into a predetermined size. The positive electrode can be thus obtained.

In the case where PTFE and/or a modified product thereof, or a core-shell type rubber particle is used as the binder, and carboxymethyl cellulose and/or a modified product thereof is used as the thickening agent, water is used as the dispersion medium.

In the case where PVDF or a modified product thereof, a core-shell type rubber particle, or a rubber material soluble in an organic solvent is used as the binder, N-methyl-2-pyrrolidone (hereinafter also referred to as NMP) is used as the dispersion medium.

As the binder included in the negative electrode, PVDF or a modified product, styrene-butadiene copolymer (hereinafter also referred to as SBR), a core-shell type rubber particle including polyacrylonitrile, or the like may be used.

In addition, in the case where SBR and/or a core-shell type rubber particle is used as the binder, it is preferable that CMC and/or a modified product thereof is added as the thickening agent.

The negative electrode may be fabricated, for example, in the following manner.

A negative electrode active material, a binder, and if necessary, a thickening agent are mixed with a dispersion medium to give a negative electrode material mixture pate. The resultant negative electrode material mixture paste is applied onto a negative electrode current collector composed of a cupper foil and then dried to form a negative electrode material mixture layer on the current collector. Subsequently, the negative electrode material mixture layer is rolled until a predetermined thickness is obtained. Thereafter, the resultant electrode plate is cut into a predetermined size, whereby the negative electrode can be obtained.

In the case where SBR and/or a core-shell type rubber particle is used as the binder, and CMC and/or a modified product is used as the thickening agent, it is preferable that water is used as the dispersion medium.

In the case where PVDF and/or a modified product thereof is used as the binder, it is preferable that NMP or the like is used as the dispersion medium.

As the separator, a polyolefin-based miroporous film may be used. Examples thereof include a film made of polyethylene and a film made of polypropylene.

The non-aqueous electrolyte includes a non-aqueous solvent and a solute dissolved therein. As the non-aqueous solvent, for example, ethylene carbonate, diethyl carbonate, dimethyl carbonate or ethyl methyl carbonate may be used. For the solute, for example, $LiPF_6$ or $LiBF_4$ may be used.

It is preferable that an additive such as vinylene carbonate or cyclohexylbenzene is further added into the non-aqueous electrolyte. This forms a protective film of high quality on the surface of the negative electrode, making it possible, for example, to improve the stability of the battery during overcharge.

No particular limitation is imposed on the shape of the non-aqueous electrolyte secondary battery of the present invention. For example, the shape of the battery may be cylindrical or prismatic. In the case where the shape of the battery is cylindrical, an electrode assembly having a circular transverse cross section is used; and in the case where the shape of the battery is prismatic, an electrode assembly having a substantially rectangular transverse cross section is used.

The present invention is hereinafter described with reference to Examples.

Example 1

In this Example, the cut-off voltage of charge was changed.

Battery 1

In this battery, the cut-off voltage of charge was 4.4 V.
(i) Fabrication of a Positive Electrode As a positive electrode active material, $LiNi_{1/3}Mn_{1/3}Co_{1/3}O_2$ was used. The positive electrode active material was produced in the following manner.

First, into an aqueous solution containing equimolar amount of nickel sulfate, manganese sulfate and cobalt sulfate, alkali hydroxide having a predetermined concentration was added to give a precipitate. Then, the precipitate was filtered, rinsed with water and then dried to obtain a hydroxide. This hydroxide and lithium carbonate were mixed in a predetermined molar ratio. The resultant mixture was baked at 900° C. for 24 hours to yield $LiNi_{1/3}Mn_{1/3}Co_{1/3}O_2$ as the positive electrode active material.

Next, 100 parts by weight of the positive electrode active material obtained as described above (mean particle size: 12 μm), 3 parts by weight of acetylene black (available from Denki Kagaku Kogyo K. K.) as a conductive agent, and a dispersion (#1320 available from Kureha Chemical Industry Co., Ltd.) containing polyvinylidene fluoride as a binder were mixed to give a mixture. The adding amount of polyvinylidene fluoride was 4 parts by weight.

The resultant mixture was evenly dispersed in N-methyl-2-pyrrolidone (NMP) as a dispersion medium to give a positive electrode material mixture paste. The positive electrode material mixture paste was applied on both faces of a 15 μm thick positive electrode current collector composed of an aluminum foil, and then dried to form a positive electrode material mixture layer, whereby an electrode plate was obtained. Subsequently, the electrode plate was rolled. After this rolling, the density of the positive electrode active material only in the positive electrode material mixture layer was 3.1 g/cc, and the thickness of the electrode plate was 130 μm. The electrode plate after rolling was then cut to yield a positive electrode having dimensions of 52 mm in width and 657 mm in length.

The dimensions of the positive electrode material mixture layer were 52 mm in width and 627 mm in length. The positive electrode current collector was provided with an exposed portion at one end thereof, from which the winding of the positive electrode was to be started in the process of forming an electrode assembly. The length of the exposed portion was 30 mm in the length direction of the positive electrode and the width thereof was coincided with that of the current collector. A positive electrode lead made of metallic aluminum was welded to the exposed portion. The exposed portion was not opposed to the negative electrode in the formed electrode assembly. It is to be noted that the length and the width of the exposed portion of the positive electrode current collector were the same as those described above in the following Examples.

In this Example, a positive electrode capacity A at a predetermined cut-off voltage of charge was determined by a single electrode test as follows.

In this single electrode test, charging was performed using metallic lithium as a counter electrode at a current density of 0.5 mA/cm², for example, until the potential of the positive electrode reached 4.5 V (equivalent to 4.4 V of an actual battery including graphite as the negative electrode) in the case where the cut-off voltage of charge was 4.4 V (vs., graphite), whereby an effective capacity of the positive electrode was determined.

The effective capacity obtained by the above single electrode test, that is, the effective capacity per unit weight of the positive electrode active material at a cut-off voltage of charge of 4.4 V, was 173 mAh/g.

An irreversible capacity C (mAh) of the positive electrode was determined by discharging at a current density of 0.5 mA/cm$^2$ until the potential of positive electrode reached 3.1 V (equivalent to 3.0 V of an actual battery including graphite as the negative electrode) after the charging in the above single electrode test. The result showed that the irreversible capacity per unit weight of the positive electrode active material was 21 mAh/g.

A positive electrode capacity A was determined by multiplying a sum of the effective capacity per unit weight and the irreversible capacity per unit weight determined as described above by the weight of the positive electrode active material included in the battery.

(ii) Fabrication of a Negative Electrode 100 parts by weight of graphite (MAG available from Hitachi Chemical Co., Ltd.) (mean particle size: 23 μm) as a negative electrode active material, one part by weight of NiO (available from Kanto Chemical Co., Ltd.) (mean particle size: 10 μm) as a negative electrode additive, a liquid including styrene-butadiene copolymer (#2108 available from JSR Co., Ltd.) as a binder, and one part by weight of carboxymethyl cellulose (CMC) (SEROGEN 4H available from Daiichi Kogyo Seiyaku Co., Ltd.) as a thickening agent were mixed to give a mixture. The adding amount of the styrene-butadiene copolymer was 3 parts by weight.

The mixture was mixed with water to prepare a negative electrode material mixture paste. The resultant negative electrode material mixture paste was applied on both faces of a negative electrode current collector composed of a copper foil and then dried to form a negative electrode material mixture layer, whereby an electrode plate was obtained. Subsequently, the electrode plate was rolled. After this rolling, the density of the negative electrode active material only was 1.5 g/cc, and the thickness of the electrode plate was 147 μm.

Thereafter, the electrode plate after rolling was cut to yield a negative electrode having dimensions of 56 mm in width and 632 mm in length. The dimensions of the negative electrode material mixture layer were 56 mm in width and 627 mm in length. The negative electrode current collector was provided with an exposed portion at one end thereof, at which the winding of the negative electrode was to be completed in the process of forming an electrode assembly. The length of the exposed portion was 5 mm in the length direction of the negative electrode and the width thereof was coincided with that of the negative electrode current collector. A negative electrode lead made of metallic nickel was welded to the exposed portion. The exposed portion of the negative electrode current collector was not opposed to the positive electrode in the formed electrode assembly. It is to be noted that the length and the width of the exposed portion of the negative electrode current collector were the same as those described above in the following Examples.

The width of the negative electrode material mixture layer was slightly larger than the width of the positive electrode material mixture layer. This applies to the following Examples.

In the negative electrode thus fabricated, the weight B of the graphite included in the portion having the same area as that of the positive electrode material mixture layer opposing thereto was 6.804 g. The capacity of the NiO per unit weight was 878 mAh/g.

The weight of the positive electrode active material included in the battery was 11.646 g. Therefore, the positive electrode capacity A was calculated as 2259 mAh, and the irreversible capacity C was calculated as 244 mAh. In addition, the weight B of the graphite (negative electrode active material) included in the battery was 6.804 g as described above. Therefore, the A/B was 332 mAh/g.

(iii) Assembling of a Battery

A non-aqueous electrolyte secondary battery as shown in FIG. 1 was fabricated.

The positive electrode and the negative electrode fabricated as described above, and a separator interposed between the positive electrode and the negative electrode were wound to be formed into a cylindrical electrode assembly. The thickness of the separator was 20 μm.

The width of the negative electrode was 4 mm larger than the width of the positive electrode. While the lengthwise axis of the negative electrode was coincided with the lengthwise axis of the positive electrode, the positive electrode was arranged so that it does not protrude from the negative electrode in the width direction.

The positive electrode lead was disposed in the upper portion of the electrode assembly, and the negative electrode lead was disposed in the lower portion of the electrode assembly.

On top and bottom of the electrode assembly thus fabricated, an upper insulating plate and a lower insulating plate made of polypropylene were disposed, respectively. Then the whole was inserted into a cylindrical battery case made of nickel plated iron having a diameter of 18 mm and a height of 65 mm. The other end of the positive electrode lead was welded to the back face of the sealing plate and the other end of the negative electrode lead was welded to the bottom of the battery case.

Prior to sealing the opening of the battery case, the battery case was heated at 60° C. under vacuum and then dried. Subsequently, 5.8 g of non-aqueous electrolyte was injected into the battery case. As the non-aqueous electrolyte, a solution obtained by dissolving 1.2 M of lithium hexafluorophosphate (LiPF$_6$) into a solvent mixture of ethylene carbonate, ethyl methyl carbonate and dimethyl carbonate at a volume ratio of 2:3:3 was used.

Thereafter, the opening end of the battery case was crimped onto the sealing plate via a gasket to seal the battery case, whereby a non-aqueous electrolyte secondary battery was obtained. The battery thus obtained was referred to as Battery 1.

After fabrication, prior to the evaluation as described below, this battery was charged by 700 mAh at a constant current of 400 mA, and then discharged until 2.5 V is reached. Thereafter, a charge and discharge operation between 4.1 V and 2.5 V was performed twice. This was applied to the following batteries and the other Examples.

Charge and discharge curves under the conditions as described above are shown in FIG. 2.

Figure 2:
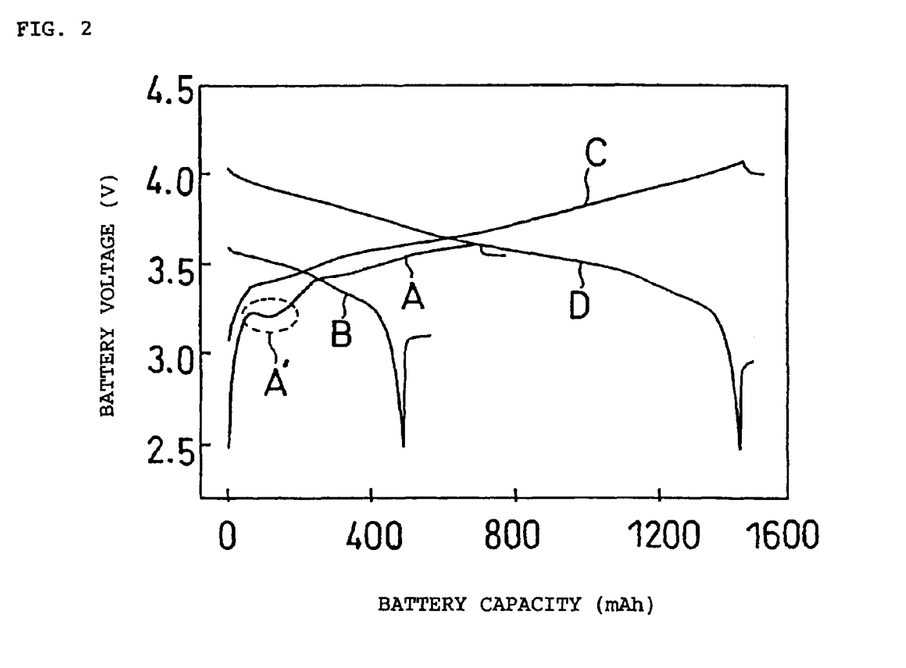

In the charge (curve A) at the first cycle, a voltage behavior (area A') in correspondence with the reaction of the negative electrode additive and lithium was observed. However, in the discharge (curve B) at the first cycle and the charge (curve C) and the discharge (curve D) at the second cycle, this behavior was not observed. The behavior was not observed either at the third and subsequent cycles. This is because that the reaction of NiO used as the negative electrode additive and lithium is irreversible.

The initial charge capacity at the first cycle was 700 mAh, and the initial discharge capacity was 455 mAh. Since an irreversible capacity of Battery 1 is represented by the formula (1): (initial charge capacity)−(initial discharge capacity), the irreversible capacity of Battery 1 was calculated as 245 mAh with the above numerical values. This value was substantially equivalent to the irreversible capacity C obtained in the single electrode test.

Five batteries were fabricated as Battery 1 in the manner as described above.

One of the five batteries as Battery 1 was selected, and subjected to a charge and discharge cycle as follows to determine an initial discharge capacity thereof. The battery was charged at a constant current of 1400 mA until the battery voltage reached 4.4 V, and then charged at a constant voltage of 4.4 V for three hours. Subsequently, the battery after charge was discharged at a constant current of 400 mA until the battery voltage is reduced to 3.0 V.

The result showed that the discharge capacity of Battery 1 was 2018 mAh, which was substantially equivalent to the value (2015 mAh) calculated using the capacity of the positive electrode active material per unit weight in the single electrode test.

Since an irreversible capacity (D) of the negative electrode is a sum of a theoretical lithiation amount D1 (58 mAh) of NiO and an irreversible capacity D2 (161 mAh) of graphite, the irreversible capacity (D) was 219 mAh.

In this Battery 1, the irreversible capacity C calculated with the formula (I) and the irreversible capacity D were 245 mAh and 219 mAh, respectively, showing C>D.

Battery 2

In Battery 2, the cut-off voltage of charge was 4.25 V.

The same positive electrode as used for Battery 1 was used, and the cut-off voltage of charge in the single electrode test was set to 4.35 V (equivalent to 4.25 V of an actual battery using graphite as the negative electrode) to determine a capacity of the positive electrode active material per unit weight. The result showed that the capacity of the positive electrode active material was 154 mAh/g. On the basis of this capacity, the amount of the negative electrode material mixture paste to be applied was changed so that the same A/B could be obtained as in the case of Battery 1. The length of the positive electrode was set to 688 mm, the length of the negative electrode was set to 663 mm, and the thickness of the negative electrode was set to 132 μm. Battery 3 was fabricated in the same manner as in Battery 1, except these.

In Battery 2, the irreversible capacity C was 257 mAh, and the irreversible capacity D was 205 mAh, showing C>D.

Battery 3

In Battery 3, the cut-off voltage of charge was 4.6 V.

The same positive electrode as used for Battery 1 was used, and the cut-off voltage of charge in the single electrode test was set to 4.7 V (equivalent to 4.6 V of an actual battery using graphite as the negative electrode) to determine a capacity of the positive electrode active material per unit weight. The result showed that the capacity of the positive electrode active material was 189 mAh/g. On the basis of this capacity, the amount of the negative electrode material mixture paste to be applied was changed so that the same A/B could be obtained as in the case of Battery 1. The length of the positive electrode was set to 632 mm, the length of the negative electrode was set to 607 mm, and the thickness of the negative electrode was set to 160 μm. Battery 3 was fabricated in the same manner as in Battery 1, except these.

In Battery 3, the irreversible capacity C was 235 mAh, and the irreversible capacity D was 230 mAh, showing C>D.

Comparative Battery 1

In Comparative Battery 1, the cut-off voltage of charge was 4.2 V.

The same positive electrode as used for Battery 1 was used, and the cut-off voltage of charge in the single electrode test was set to 4.3 V (equivalent to 4.2 V of an actual battery using graphite as the negative electrode) to determine a capacity of the positive electrode active material per unit weight. The result showed that the capacity of the positive electrode active material was 149 mAh/g. On the basis of this capacity, the amount of the negative electrode material mixture paste to be applied was changed so that the same A/B was could be obtained as in the case of Battery 1. The length of the positive electrode was set to 697 mm, the length of the negative electrode was set to 672 mm, and the thickness of the negative electrode was set to 128 μm. Comparative Battery 1 was fabricated in the same manner as in Battery 1 except these.

In Comparative Battery 1, the irreversible capacity C was 260 mAh, and the irreversible capacity D was 201 mAh, showing C>D.

Comparative Battery 2

In Comparative Battery 2, the cut-off voltage of charge was 4.7 V.

The same positive electrode as used for Battery 1 was used, and the cut-off voltage of charge in the single electrode test was set to 4.8 V (equivalent to 4.7 V of an actual battery using graphite as the negative electrode) to determine a capacity of the positive electrode active material per unit weight. The result showed that the capacity of the positive electrode active material was 193 mAh. On the basis of this capacity, the amount of the negative electrode material mixture paste to be applied was changed so that the same A/B could be obtained as in the case of Battery 1. The length of the positive electrode was set to 627 mm, the length of the negative electrode was set to 602 mm, and the thickness of the negative electrode was set to 163 μm. Comparative Battery 2 was fabricated in the same manner as in Battery 1 except these.

In Comparative Battery 2, the irreversible capacity C was 233 mAh, and the irreversible capacity D was 232 mAh, showing C>D.

Table 1 shows the cut-off voltage of charge, the type and the amount of the negative electrode additive used and the positive electrode active material used, in Batteries 1 to 3 and Comparative Batteries 1 to 2.

TABLE 1

|  | Cut-off voltage of charge (V) | Type of negative electrode additive | Amount of negative electrode additive (Part by weight) | Positive electrode active material |
|---|---|---|---|---|
| Battery 1 | 4.4 | NiO | 1 | $LiNi_{1/3}Mn_{1/3}Co_{1/3}O_2$ |
| Battery 2 | 4.25 | NiO | 1 | $LiNi_{1/3}Mn_{1/3}Co_{1/3}O_2$ |
| Battery 3 | 4.6 | NiO | 1 | $LiNi_{1/3}Mn_{1/3}Co_{1/3}O_2$ |
| Comparative Battery 1 | 4.2 | NiO | 1 | $LiNi_{1/3}Mn_{1/3}Co_{1/3}O_2$ |
| Comparative Battery 2 | 4.7 | NiO | 1 | $LiNi_{1/3}Mn_{1/3}Co_{1/3}O_2$ |

[Evaluation]

With respect to Batteries 1 to 3 and Comparative Batteries 1 to 2, an initial battery capacity, and a number of cycles performed until the battery capacity after a predetermined charge and discharge cycle was repeated reached 70% of the initial battery capacity were determined.

The initial battery capacity was determined in the following manner.

First, Batteries 1 to 3 and Comparative Batteries 1 to 2 were charged at the cut-off voltage of charge predetermined for each battery. The maximum value of current was 1400 mA and the charge duration was three hours. Subsequently, the batteries after charge were discharged at a constant current of 400 mA until the battery voltage was reduced to 3.0 V. The battery capacity obtained at this discharge was referred to as the initial battery capacity. The environmental temperature was 25° C.

The same charge and discharge cycle as performed when the initial battery capacity was determined was repeated. The number of cycles performed until the battery capacity reached 70% of the initial battery capacity was determined.

Table 2 shows the A/B (mAh/g), the irreversible capacity C (mAh), the irreversible capacity D (mAh), the initial battery capacity (mAh), and the number of cycles (cycles) performed until the battery capacity reached 70% of the initial battery capacity, of each battery.

TABLE 2

|  | A/B (mAh/g) | Irreversible capacity C (mAh) | Irreversible capacity D (mAh) | Initial battery capacity (mAh) | Number of cycles (cycles) |
|---|---|---|---|---|---|
| Battery 1 | 332 | 244 | 219 | 2018 | 351 |
| Battery 2 | 333 | 257 | 205 | 1882 | 478 |
| Battery 3 | 332 | 235 | 230 | 2113 | 284 |
| Comparative Battery 1 | 332 | 260 | 201 | 1846 | 511 |
| Comparative Battery 2 | 332 | 233 | 232 | 2140 | 141 |

In Batteries 1 to 3 the cut-off voltage of charges of which were increased while the balance between the capacities of the positive electrode and the negative electrode was taken into consideration, an improvement was observed in the initial battery capacity, compared with Comparative Example 1 the cut-off voltage of charge in which was normal at 4.2 V. In contrast, Comparative Example 2 the cut-off voltage of charge of which was 4.7 V, a significant reduction was observed in the number of cycles performed until the battery capacity reached 70% of the initial battery capacity. Therefore, it is required that the cut-off voltage of charge fall within a range from 4.25 to 4.6 V.

Example 2

In this Example, the type of the negative electrode additive to be added into the negative electrode was changed.

Batteries 4 to 13

Batteries 4 to 13 were fabricated in the same manner as in Battery 1 except that CoO, $Co_2O_3$, $Co_3O_4$, $TiO_2$, $MnO_2$, $Fe_3O_4$, Sn, Si, SiO or $SiO_{1.5}$ was used as the negative electrode additive in place of NiO and each of the negative electrode additives was added in an amount as shown in Table 3.

Battery 14

Battery 14 was fabricated in the same manner as in Battery 1 except that a mixture containing NiO and CoO at a ratio of 1:1 (weight ratio) was used as the negative electrode additive and the amount of the mixture added was 1.5 parts by weight per 100 parts by weight of the negative electrode active material.

Table 3 shows the cut-off voltage of charge, the type and the amount of the negative electrode additive used and the positive electrode active material used in Batteries 4 to 14.

TABLE 3

|  | Cut-off voltage of charge (V) | Type of negative electrode additive | Amount of negative electrode additive (Part by weight) | Positive electrode active material |
|---|---|---|---|---|
| Battery 4 | 4.4 | CoO | 1.2 | $LiNi_{1/3}Mn_{1/3}Co_{1/3}O_2$ |
| Battery 5 | 4.4 | $Co_2O_3$ | 0.9 | $LiNi_{1/3}Mn_{1/3}Co_{1/3}O_2$ |
| Battery 6 | 4.4 | $Co_3O_4$ | 1 | $LiNi_{1/3}Mn_{1/3}Co_{1/3}O_2$ |
| Battery 7 | 4.4 | $TiO_2$ | 0.7 | $LiNi_{1/3}Mn_{1/3}Co_{1/3}O_2$ |
| Battery 6 | 4.4 | $MnO_2$ | 0.7 | $LiNi_{1/3}Mn_{1/3}Co_{1/3}O_2$ |

TABLE 3-continued

|  | Cut-off voltage of charge (V) | Type of negative electrode additive | Amount of negative electrode additive (Part by weight) | Positive electrode active material |
|---|---|---|---|---|
| Battery 9 | 4.4 | $Fe_3O_4$ | 0.9 | $LiNi_{1/3}Mn_{1/3}Co_{1/3}O_2$ |
| Battery 10 | 4.4 | Sn | 2.9 | $LiNi_{1/3}Mn_{1/3}Co_{1/3}O_2$ |
| Battery 11 | 4.4 | Si | 1.2 | $LiNi_{1/3}Mn_{1/3}Co_{1/3}O_2$ |
| Battery 12 | 4.4 | SiO | 1 | $LiNi_{1/3}Mn_{1/3}Co_{1/3}O_2$ |
| Battery 13 | 4.4 | $SiO_{1.5}$ | 2.9 | $LiNi_{1/3}Mn_{1/3}Co_{1/3}O_2$ |
| Battery 14 | 4.4 | NiO + CoO | 1.5 | $LiNi_{1/3}Mn_{1/3}Co_{1/3}O_2$ |

An initial battery capacity and a number of cycles performed until the battery capacity after a predetermined charge and discharge cycle was repeated reached 70% of the initial battery capacity of Batteries 4 to 14 were determined in the same manner as in Example 1. The results thus obtained are shown in Table 4. The value of A/B, the irreversible capacity C and the irreversible capacity D are also shown in Table 4.

TABLE 4

|  | A/B (mAh/g) | Irreversible capacity C (mAh) | Irreversible capacity D (mAh) | Initial battery capacity (mAh) | Number of cycles (cycles) |
|---|---|---|---|---|---|
| Battery 4 | 331 | 245 | 218 | 2015 | 342 |
| Battery 5 | 330 | 243 | 219 | 2011 | 329 |
| Battery 6 | 328 | 243 | 220 | 2016 | 363 |
| Battery 7 | 330 | 245 | 218 | 2018 | 355 |
| Battery 6 | 331 | 244 | 218 | 2011 | 344 |
| Battery 9 | 332 | 243 | 216 | 2015 | 339 |
| Battery 10 | 329 | 243 | 218 | 2015 | 361 |
| Battery 11 | 330 | 246 | 219 | 2016 | 354 |
| Battery 12 | 331 | 244 | 218 | 2015 | 342 |
| Battery 13 | 328 | 244 | 223 | 2016 | 345 |
| Battery 14 | 332 | 245 | 241 | 2017 | 357 |

The results in Table 4 indicate that even when the negative electrode additives other than NiO are used, the same level of initial battery capacity and cycle characteristic as those when NiO is used can be obtained.

Example 3

In this Example, the amount of the negative electrode additive to be added into the negative electrode was changed.

Batteries 15 to 16

Batteries 15 and 16 were fabricated in the same manner as in Battery 1 except that the amount of NiO to be added into the negative electrode was changed to 0.5 part by weight and 1.4 parts by weight, respectively, per 100 parts by weight of the negative electrode active material.

In these batteries 15 and 16, the A/B was 339 mAh/g and 331 mAh/g, respectively.

Comparative Battery 3

Comparative Battery 3 was fabricated in the same manner as in Battery 1 except that the amount of NiO to be added into the negative electrode was changed to 0.1 part by weight per 100 parts by weight of the negative electrode active material. In Comparative Battery 3, the A/B was 343 mAh/g.

In Batteries 15 to 16 and Comparative Battery 3, Irreversible capacity C>Irreversible capacity D.

Comparative Battery 4

Comparative Battery 4 was fabricated in the same manner as in Battery 1 except that the amount of NiO to be added into the negative electrode was changed to 2 parts by weight per 100 parts by weight of the negative electrode active material. In Comparative Battery 4, the A/B was 326 mAh/g. In Comparative Battery 4, the irreversible capacity C was 246 mAh, and the irreversible capacity D was 278 mAh, indicating C<D.

After the fabrication, prior to the evaluation as performed in Example 1, Batteries 15 to 16 and Comparative Batteries 3 to 4 were subjected to three cycles of charge and discharge as performed in Battery 1. As a result, in Comparative Battery 3, a voltage behavior considered as a side reaction was observed in the final stage of the charge at the second and subsequent cycles. Consequently, Comparative Battery 3 was disassembled, and it was found that metallic lithium was deposited on the surface of the negative electrode. In contrast, such behavior was not observed in Batteries 15 to 16 and Comparative Battery 4.

Batteries 17 to 18

Batteries 17 and 18 were fabricated in the same manner as in Battery 1 except that Sn was used as the negative electrode additive and the amount of Sn to be added into the negative electrode was 1 part by weight and 4.2 parts by weight, respectively, per 100 parts by weight of the negative electrode active material.

Comparative Battery 5

Comparative Battery 5 was fabricated in the same manner as in Battery 1 except that Sn was used as the negative electrode additive and the amount of Sn to be added into the negative electrode was changed to 0.4 part by weight per 100 parts by weight of the negative electrode active material. In Comparative Battery 5, the A/B was 344 mAh/g.

In Batteries 17 to 18 and Comparative Battery 5, Irreversible capacity C≧Irreversible capacity D.

Comparative Battery 6

Comparative Battery 6 was fabricated in the same manner as in Battery 1 except that Sn was used as the negative electrode additive and the amount of Sn to be added into the negative electrode was changed to 5 parts by weight per 100 parts by weight of the negative electrode active material. In Comparative Battery 6, the A/B was 327 mAh/g. In Comparative Battery 6, the irreversible capacity C was 245 mAh, and the irreversible capacity D was 261 mAh, showing C<D.

After the fabrication, prior to the evaluation as performed in Example 1, the above Batteries 17 to 18 and Comparative Batteries 5 to 6 were subjected to three cycles of charge and discharge as performed in Battery 1. As a result, in Comparative Battery 5, as was observed in the above Comparative Battery 3, a voltage behavior considered as a side reaction was observed in the final stage of the charge at the second and subsequent cycles. Consequently, Comparative Battery 5 was disassembled, and it was found that metallic lithium was deposited on the surface of the negative electrode. In contrast, such behavior was not observed in Batteries 17 to 18 and Comparative Battery 6.

Comparative Battery 7

Comparative Battery 7 was fabricated in the same manner as in Battery 1 except that a negative electrode additive was not added into the negative electrode material mixture paste. In Comparative Battery 7, the A/B was 344 mAh/g. Since no negative electrode additive was included in the negative electrode, the irreversible capacity D was derived only from the theoretical irreversible capacity D2 of graphite. Accordingly, in Comparative Battery 7, Irreversible capacity C>Irreversible capacity D.

Table 5 shows the cut-off voltage of charge, the type and the amount of the negative electrode additive used the positive electrode active material used in Batteries to 18 and Comparative Examples 3 to 7.

TABLE 5

|  | Cut-off voltage of charge (V) | Type of negative electrode additive | Amount of negative electrode additive (Part by weight) | Positive electrode active material |
|---|---|---|---|---|
| Battery 15 | 4.4 | NiO | 0.5 | $LiNi_{1/3}Mn_{1/3}Co_{1/3}O_2$ |
| Battery 16 | 4.4 | NiO | 1.4 | $LiNi_{1/3}Mn_{1/3}Co_{1/3}O_2$ |
| Comparative Battery 3 | 4.4 | NiO | 0.1 | $LiNi_{1/3}Mn_{1/3}Co_{1/3}O_2$ |
| Comparative Battery 4 | 4.4 | NiO | 2 | $LiNi_{1/3}Mn_{1/3}Co_{1/3}O_2$ |
| Battery 17 | 4.4 | Sn | 1 | $LiNi_{1/3}Mn_{1/3}Co_{1/3}O_2$ |
| Battery 18 | 4.4 | Sn | 4.2 | $LiNi_{1/3}Mn_{1/3}Co_{1/3}O_2$ |
| Comparative Battery 5 | 4.4 | Sn | 0.4 | $LiNi_{1/3}Mn_{1/3}Co_{1/3}O_2$ |
| Comparative Battery 6 | 4.4 | Sn | 5 | $LiNi_{1/3}Mn_{1/3}Co_{1/3}O_2$ |
| Comparative Battery 7 | 4.4 | — | — | $LiNi_{1/3}Mn_{1/3}Co_{1/3}O_2$ |

With respect to Batteries 15 to 18 and Comparative Batteries 3 to 7, an initial battery capacity, and a number of cycles performed until the battery capacity after the charge and discharge cycle was repeated reached 70% of the initial battery capacity were determined in the same manner as in Example 1. The results thus obtained are shown in Table 6. The value of A/B, the irreversible capacity C and the irreversible capacity D are also shown in Table 6.

TABLE 6

|  | A/B (mAh/g) | Irreversible capacity C (mAh) | Irreversible capacity D (mAh) | Initial battery capacity (mAh) | Number of cycles (cycles) |
|---|---|---|---|---|---|
| Battery 15 | 339 | 246 | 222 | 2016 | 333 |
| Battery 16 | 331 | 245 | 243 | 2010 | 360 |
| Comparative Battery 3 | 343 | 244 | 163 | 2013 | 155 |
| Comparative Battery 4 | 326 | 246 | 278 | 1981 | 367 |
| Battery 17 | 337 | 245 | 183 | 2015 | 326 |
| Battery 18 | 333 | 245 | 245 | 2015 | 350 |
| Comparative Battery 5 | 344 | 246 | 169 | 2013 | 127 |
| Comparative Battery 6 | 327 | 245 | 261 | 1988 | 357 |
| Comparative Battery 7 | 344 | 245 | 160 | 2014 | 113 |

Comparison between Batteries 15 to 16 that includes a negative electrode additive and Comparative Battery 7 that does not include a negative electrode additive indicates a significant improvement in cycle characteristic in Batteries 15 to 16.

Likewise, comparison between Batteries 17 to 18 and Comparative Battery 7 indicates a significant improvement in cycle characteristic in Batteries 17 to 18.

In addition, in Comparative Battery 7, a voltage behavior considered as a side reaction was observed in the final stage of the charge at the second and subsequent cycles. Consequently, this battery was disassembled, and it was found that metallic lithium was deposited on the surface of the negative electrode.

Since the amount of NiO added was small, in Comparative Batteries 3 and 5, as observed in Comparative Battery 7, a significant reduction in cycle characteristic was observed, compared with Batteries 15 to 18.

In contrast, in Comparative Battery 4 in which the amount of NiO added was large, since the lithium that was supposed to serve as battery capacity was consumed, Irreversible capacity C<Irreversible capacity D. Moreover, in Comparative Battery 4, 35 mAh out of the battery capacity was consumed by NiO, and thus the battery capacity was reduced.

In Comparative Battery 6, as in the case of Comparative Battery 4, Irreversible capacity C<Irreversible capacity D. In addition, a part of the battery capacity was consumed excessively by the negative electrode additive, and thus the battery capacity was reduced.

In the Examples above, the amount of NiO or Sn added was changed. It is to be noted that the adding amount of a negative electrode additive is determined differently depending on the capacity of a negative electrode additive to be used. Regardless of which negative electrode additive is used, it is sufficient if the negative electrode additive is added in an amount such that an amount of lithium equivalent to or less than the difference between the irreversible capacity C and the irreversible capacity D can be consumed. By doing this, it is possible to improve the battery capacity while maintaining the cycle characteristic of the battery, compared with the case where a negative electrode additive is not added.

It is to be noted that as described above, also in Comparative Battery 3 and Comparative Battery 5, a deposition of metallic lithium on the surface of the negative electrode was observed; however, the cycle characteristic tended to show an improvement by adding even a small amount of a negative electrode additive, compared with Comparative Battery 7.

Example 4

In this Example, the A/B was changed.

Batteries 19 to 21

The amount of the negative electrode active material mixture paste to be applied was varied to change the A/B to be 306 mAh/g, 332 mAh/g or 340 mAh/g, and the thickness and the length of the positive electrode and the negative electrode were changed in accordance with the A/B. Batteries 19 to 21 were fabricated in the same manner as in Battery 1 except these. Battery 20 was the same as Battery 1 as described above.

In these Batteries 19 to 21, Irreversible capacity C>Irreversible capacity D.

Comparative Batteries 8 to 9

The amount of the negative electrode active material mixture paste to be applied was varied to change the A/B to be 276 mAh/g or 346 mAh/g, and the thickness and the length of the positive electrode and the negative electrode were changed in accordance with the A/B. Comparative Batteries 8 and 9 were fabricated in the same manner as in Battery 1 except these.

Table 7 shows the cut-off voltage of charge, the type and the amount of the negative electrode additive used and the positive electrode active material used in Batteries 19 to 21 and Comparative Batteries 8 to 9.

tery capacity were determined in the same manner as in Example 1. The results thus obtained are shown in Table 8. The value of A/B, the irreversible capacity C and the irreversible capacity D are also shown in Table 8.

TABLE 8

|  | A/B (mAh/g) | Irreversible capacity C (mAh) | Irreversible capacity D (mAh) | Initial battery capacity (mAh) | Number of cycles (cycles) |
|---|---|---|---|---|---|
| Battery 19 | 306 | 234 | 229 | 1928 | 388 |
| Battery 20 | 332 | 244 | 219 | 2018 | 351 |
| Battery 21 | 340 | 246 | 216 | 2024 | 343 |
| Comparative Battery 8 | 276 | 222 | 244 | 1810 | 404 |
| Comparative Battery 9 | 346 | 250 | 213 | 2056 | 98 |

The results of Batteries 19 to 21 and Comparative Batteries 8 to 9 indicate that the initial battery capacity was increased as the A/B was increased. On the other hand, the cycle characteristic was deteriorated as the value of A/B was increased. In particular, in Comparative Battery 9 in which the A/B exceeds 340 mAh/g, this tendency was remarkable. It is considered that this is influenced by the presence or not of metallic lithium deposited on the surface of the negative electrode.

In Comparative Battery 8, since the amount of the negative electrode active material relative to the positive electrode active material is large, Irreversible capacity C<Irreversible capacity D. In this case, the cycle characteristic was excellent, but the battery capacity was reduced.

Example 5

Battery 22

A negative electrode additive was not added into a negative electrode material mixture paste, and the negative electrode material mixture paste was used to form a negative electrode material mixture layer. Subsequently, NiO and CMC were mixed at a weight ratio of 100:1 and then the resultant mixture and an appropriate amount of water were mixed to prepare paint. The paint was applied with a commercially available spray onto the surface of the negative electrode material mixture layer so that the amount of the paint was 1 part by weight per 100 parts by weight of the negative electrode active mate-

TABLE 7

|  | Cut-off voltage of charge (V) | Type of negative electrode additive | Amount of negative electrode additive (Part by weight) | Positive electrode active material |
|---|---|---|---|---|
| Battery 19 | 4.4 | NiO | 1 | $LiNi_{1/3}Mn_{1/3}Co_{1/3}O_2$ |
| Battery 20 | 4.4 | NiO | 1 | $LiNi_{1/3}Mn_{1/3}Co_{1/3}O_2$ |
| Battery 21 | 4.4 | NiO | 1 | $LiNi_{1/3}Mn_{1/3}Co_{1/3}O_2$ |
| Comparative Battery 8 | 4.4 | NiO | 1 | $LiNi_{1/3}Mn_{1/3}Co_{1/3}O_2$ |
| Comparative Battery 9 | 4.4 | NiO | 1 | $LiNi_{1/3}Mn_{1/3}Co_{1/3}O_2$ |

With respect to Batteries 19 to 21 and Comparative Batteries 8 to 9, an initial battery capacity, and a number of cycles performed until the battery capacity after the charge and discharge cycle was repeated reached 70% of the initial batrial, to form a layer composed of the negative electrode additive on the negative electrode material mixture layer. Battery 22 was fabricated in the same manner as in Battery 1 except these.

Also in Battery 22, Irreversible capacity C>Irreversible capacity D.

Table 9 shows the cut-off voltage of charge, the type and the amount of the negative electrode additive used and the positive electrode active material used in Battery 22. The values of these in Battery 1 are also shown in Table 9.

TABLE 9

|  | Cut-off voltage of charge (V) | Type of negative electrode additive | Amount of negative electrode additive (Part by weight) | Positive electrode active material |
|---|---|---|---|---|
| Battery 1 | 4.4 | NiO | 1 | $LiNi_{1/3}Mn_{1/3}Co_{1/3}O_2$ |
| Battery 22 | 4.4 | NiO | 1 | $LiNi_{1/3}Mn_{1/3}Co_{1/3}O_2$ |

With respect to Battery 22, an initial battery capacity, and a number of cycles performed until the battery capacity after the charge and discharge cycle was repeated reached 70% of the initial battery capacity were determined in the same manner as in Example 1. The results thus obtained are shown in Table 10. The value of A/B, the irreversible capacity C and the irreversible capacity D are also shown in Table 10. The results with respect to Battery 1 are also shown therein.

TABLE 10

|  | A/B (mAh/g) | Irreversible capacity C (mAh) | Irreversible capacity D (mAh) | Initial battery capacity (mAh) | Number of cycles (cycles) |
|---|---|---|---|---|---|
| Battery 1 | 332 | 244 | 219 | 2018 | 351 |
| Battery 22 | 329 | 245 | 217 | 2012 | 336 |

The results show that in Battery 22 in which a layer composed of the negative electrode additive was formed on the surface of the negative electrode material mixture layer, the initial battery capacity and the cycle characteristic were substantially equivalent to those of Battery 1 in which the negative electrode additive was included in the negative electrode material mixture layer. This indicates therefore that the same effect can be achieved both in the case where the negative electrode additive is included in the negative electrode material mixture layer and in the case where the layer composed of the negative electrode additive is disposed on the surface of the negative electrode material mixture layer.

Example 6

In this Example, the type of the positive electrode active material was changed.

Battery 23

A positive electrode active material containing Co as the element M, in which Ni, Mn and Co are contained at a same molar ratio and the molar ratio of lithium was 0.98 was produced. This positive electrode active material was produced in the same manner as the positive electrode active material for use in Battery 1, except that lithium carbonate and a composite hydroxide containing equimolar amount of nickel, manganese and cobalt were mixed so that the ratio of composite hydroxide and the lithium was 1:0.98. The composition of the positive electrode active material thus obtained was $Li_{0.98}Ni_{1/3}Mn_{1/3}Co_{1/3}O_2$.

This positive electrode active material was used to fabricate Battery 23 in the same manner as in Battery 1.

Battery 24

Battery 24 was fabricated in the same manner as in Battery 23 except that the molar ratio of lithium contained in the positive electrode active material was set to 0.99. The composition of the positive electrode active material used was $Li_{0.99}Ni_{1/3}Mn_{1/3}Co_{1/3}O_2$.

Battery 25

Battery 25 was fabricated in the same manner as in Battery 23 except that the molar ratio of lithium contained in the positive electrode active material was set to 1.1. The composition of the positive electrode active material used was $Li_{1.1}Ni_{1/3}Mn_{1/3}Co_{1/3}O_2$.

In the case where a positive electrode active material in which the molar ratio of lithium contained in the positive electrode active material was 1.2 was used, in the process of preparing a positive electrode material mixture paste, the paste was gelled. This made it impossible to fabricate a battery.

It is considered that the paste is gelled because the excessive amount of lithium contained in the positive electrode active material absorbs carbon dioxide to be formed into lithium carbonate, causing a reaction between the lithium carbonate thus formed and polyvinylidene fluoride (PVDF) serving as a binder. Specifically, it is considered that hydrofluoric acid is separated from the PVDF in order to neutralize alkaline components derived from the lithium carbonate. As a result, double bonds are formed between carbon atoms present in the structure of PVDF, and thus a cross-linked structure is formed in the PVDF, whereby the paste is gelled. It is to be noted that such a reaction is possibly occurring also in the case where a positive electrode active material containing lithium at a molar ratio of 1.1 is used. However, since the reaction proceeds only to a limited extent, the paste is not gelled.

Battery 26

Battery 26 was fabricated in the same manner as in Battery 23 except that the molar ratio of lithium contained in the positive electrode active material was set to 1, the molar ratio of Mn was set to 0.4, and the total molar ratio of Mn and Co was set to 0.67. The composition of the positive electrode active material used was $LiNi_{0.33}Mn_{0.4}Co_{0.27}O_2$.

In addition, a positive electrode active material ($LiNi_{0.3}Mn_{0.45}Co_{0.3}O_2$) containing lithium at a molar ratio of 1 and Mn at a molar ratio of 0.45 in which the total molar ratio of Mn and Co was 0.7 was synthesized. However, as a result of an X-ray diffraction measurement, a peak due to a byproduct was observed, indicating that a positive electrode active material composed of a single phase was not obtained.

Battery 27

Battery 27 was fabricated in the same manner as in Battery 23 except that the molar ratio of lithium contained in the positive electrode active material was set to 1 and the total molar ratio of Mn and Co was set to 0.7. The composition of the positive electrode active material used was $LiNi_{0.3}M_{0.4}Co_{0.3}O_2$.

Comparative Battery 10

Comparative Battery 10 was fabricated in the same manner as in Battery 23 except that the molar ratio of lithium contained in the positive electrode active material was set to 1 and the total molar ratio of Mn and Co was set to 0.75. The composition of the positive electrode active material used was $LiNi_{0.25}Mn_{0.4}Co_{0.35}O_2$.

In Comparative Battery 10, the amount of nickel contained in the active material was small, the irreversible capacity C (163 mAh) was smaller than the irreversible capacity D (219 mAh).

Comparative Battery 11

Comparative Battery 11 was fabricated in the same manner as in Battery 1 except that lithium cobalt oxide ($LiCoO_2$) was used as the positive electrode active material.

In Comparative Battery 11, the irreversible capacity C was 82 mAh and irreversible capacity D was 219 mAh, also showing C<D.

In Batteries 23 to 27, the value of A/B was 300 to 328 mAh/g, and Irreversible capacity C>Irreversible capacity D.

Table 11 shows the cut-off voltage of charge, the type and the amount of the negative electrode additive used and the positive electrode active material used in Batteries 23 to 27 and Comparative Batteries 10 to 11.

TABLE 11

|  | Cut-off voltage of charge (V) | Type of negative electrode additive | Amount of negative electrode additive (Part by weight) | Positive electrode active material |
|---|---|---|---|---|
| Battery 23 | 4.4 | NiO | 1 | $Li_{0.98}Ni_{1/3}Mn_{1/3}Co_{1/3}O_2$ |
| Battery 24 | 4.4 | NiO | 1 | $Li_{0.99}Ni_{1/3}Mn_{1/3}Co_{1/3}O_2$ |
| Battery 25 | 4.4 | NiO | 1 | $Li_{1.1}Ni_{1/3}Mn_{1/3}Co_{1/3}O_2$ |
| Battery 26 | 4.4 | NiO | 1 | $LiNi_{0.33}Mn_{0.4}Co_{0.27}O_2$ |
| Battery 27 | 4.4 | NiO | 1 | $LiNi_{0.3}Mn_{0.4}Co_{0.3}O_2$ |
| Comparative Battery 10 | 4.4 | NiO | 1 | $LiNi_{0.25}Mn_{0.4}Co_{0.35}O_2$ |
| Comparative Battery 11 | 4.4 | NiO | 1 | $LiCoO_2$ |

With respect to Batteries 23 to 27 and Comparative Batteries 10 to 11, an initial battery capacity, and a number of cycles performed until the battery capacity after the charge and discharge cycle was repeated reached 70% of the initial battery capacity were determined in the same manner as in Example 1. The results thus obtained are shown in Table 12.

The value of A/B, the irreversible capacity C and the irreversible capacity D are also shown in Table 12.

TABLE 12

|  | A/B (mAh/g) | Irreversible capacity C (mAh) | Irreversible capacity D (mAh) | Initial battery capacity (mAh) | Number of cycles (cycles) |
|---|---|---|---|---|---|
| Battery 23 | 328 | 338 | 220 | 1922 | 345 |
| Battery 24 | 319 | 280 | 219 | 1980 | 357 |
| Battery 25 | 312 | 233 | 219 | 2022 | 371 |
| Battery 26 | 306 | 233 | 220 | 1981 | 318 |
| Battery 27 | 300 | 221 | 219 | 1968 | 388 |
| Comparative Battery 10 | 290 | 163 | 219 | 1923 | 396 |
| Comparative Battery 11 | 330 | 82 | 219 | 1877 | 366 |

In Comparative Battery 11 using lithium cobalt oxide as the positive electrode active material, a significant reduction was observed in the initial battery capacity, compared with Batteries 23 to 27 including a nickel-containing lithium composite oxide.

It is found that the initial battery capacity of Battery 23 in which the molar ratio of lithium is 0.98 is small compared with Battery 24 in which the molar ratio of lithium is 0.99 and Battery 25 in which the molar ratio of lithium is 1.1.

It is further found that the initial battery capacity of Comparative Battery 10 in which the total molar ratio of Mn and Co is 0.75 is small compared with Comparative Battery 27 in which the total molar ratio of Mn and Co is 0.7.

INDUSTRIAL APPLICABILITY

According to the present invention, even when a nickel-containing lithium composite oxide is used for the positive electrode active material, improvement in capacity due to increase in voltage can be achieved, while an improved cycle life can be obtained. Therefore, the non-aqueous electrolyte secondary battery of the present invention is applicable, for example, as a power source for portable electronic equipment.

The invention claimed is:

1. A non-aqueous electrolyte secondary battery comprising:

a positive electrode comprising a positive electrode material mixture layer including a nickel-containing lithium composite oxide, a negative electrode comprising a negative electrode material mixture layer including graphite, said negative electrode including an additive that reacts with the lithium at a potential higher than a maximum potential of said graphite during charge and discharge, and
a non-aqueous electrolyte,
wherein:
said battery has a cut-off voltage of charge of 4.25 to 4.6 V,
a ratio A/B of a positive electrode capacity A based on a weight of said nickel-containing lithium composite oxide and said cut-off voltage of charge relative to a weight B of said graphite in a portion of said negative electrode material mixture layer opposing to said positive electrode material mixture layer is 300 to 340 mAh/g,
an irreversible capacity C of said positive electrode and an irreversible capacity D in the portion of said negative electrode material mixture layer opposite said positive electrode material mixture layer satisfies a relation of C>D,
an amount of said additive is 0.5 to 2.9 parts by weight per 100 parts by weight of said graphite, and
said additive is at least one selected from the group consisting of SiO and $SiO_n$ ($0<n\leq1.5$).

2. The non-aqueous electrolyte secondary battery in accordance with claim 1, wherein said additive is included in said negative electrode material mixture layer.

3. The non-aqueous electrolyte secondary battery in accordance with claim 1, further comprising a separator interposed between said positive electrode and said negative electrode and a layer including said additive laminated on said negative electrode material mixture layer, said layer including said additive being disposed between said negative electrode material mixture layer and said separator.

4. The non-aqueous electrolyte secondary battery in accordance with claim 1, wherein an amount of said additive is 0.5 to 1.5 parts by weight per 100 parts by weight of said graphite.

5. The non-aqueous electrolyte secondary battery in accordance with claim 1, wherein said nickel-containing lithium composite oxide is represented by the general formula:

$$Li_xNi_{1-y-z}Mn_yM_zO_2$$

where $0.99\leq x\leq1.1$, $0<y+z\leq0.7$, $0<y\leq0.4$ and M is at least one element selected from Mg, Al, Co, Sr, Y, Zr and Mo.

* * * * *